(12) United States Patent
Chao et al.

(10) Patent No.: US 10,097,282 B1
(45) Date of Patent: Oct. 9, 2018

(54) SYSTEM AND METHOD FOR TESTING A DEVICE UNDER TEST (DUT) CAPABLE OF DETERMINING RELATIVE TIMES OF ARRIVAL OR ANGLES OF ARRIVAL OF MULTIPLE RADIO FREQUENCY SIGNALS

(71) Applicant: LitePoint Corporation, Sunnyvale, CA (US)

(72) Inventors: Yen-Fang Chao, Pleasanton, CA (US); Christian Volf Olgaard, Saratoga, CA (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/881,181

(22) Filed: Jan. 26, 2018

(51) Int. Cl.
| | |
|---|---|
| H04B 17/10 | (2015.01) |
| H04B 17/29 | (2015.01) |
| H04W 24/06 | (2009.01) |
| H04B 17/364 | (2015.01) |
| H04B 17/00 | (2015.01) |
| H04B 17/391 | (2015.01) |

(52) U.S. Cl.
CPC ........... *H04B 17/104* (2015.01); *H04B 17/29* (2015.01); *H04B 17/364* (2015.01); *H04W 24/06* (2013.01); *H04B 17/0085* (2013.01); *H04B 17/391* (2015.01)

(58) Field of Classification Search
CPC .... H04B 17/104; H04B 17/29; H04B 17/364; H04B 17/0085; H04W 24/06; H04W 17/391

See application file for complete search history.

(56) References Cited

U.S. PATENT DOCUMENTS

| | | | |
|---|---|---|---|
| 9,705,611 B1 * | 7/2017 | West | H04B 17/12 |
| 10,001,542 B1 * | 6/2018 | Steinbrecher | G01S 3/32 |
| 2014/0323041 A1 * | 10/2014 | Shana'a | H04B 5/0031 |
| | | | 455/41.1 |
| 2017/0227623 A1 * | 8/2017 | Park | G01S 3/48 |
| 2018/0059211 A1 * | 3/2018 | Furman | G01S 5/12 |
| 2018/0180709 A1 * | 6/2018 | Eaves | G01S 5/06 |

\* cited by examiner

*Primary Examiner* — Freshteh N Aghdam
(74) *Attorney, Agent, or Firm* — McCracken & Gillen LLC

(57) ABSTRACT

System and method for providing variable time delays with high temporal granularity and consistent broadband delay performance for testing of time-of-arrival (ToA) or angle-of-arrival (AoA) performances of radio frequency (RF) signal transceivers. Multiple delays may be imparted to a common RF signal to provide multiple delayed RF signals corresponding to RF signals originating from a source location and received at various locations having respective position coordinates relative to respective orthogonal axes, plus another delayed RF signal corresponding to a RF signal originating from the source location and received at a location at an intersection of the orthogonal axes.

24 Claims, 6 Drawing Sheets

PRIOR ART $\tau = d / c$,
c: speed of light

Receive Antenna

SYSTEM AND METHOD FOR TESTING A DEVICE UNDER TEST (DUT) CAPABLE OF DETERMINING RELATIVE TIMES OF ARRIVAL OR ANGLES OF ARRIVAL OF MULTIPLE RADIO FREQUENCY SIGNALS

BACKGROUND

The present invention relates to testing of wireless devices, and in particular, to controlling delays of multiple radio frequency (RF) signals transmitted to a RF signal transceiver device under test (DUT) to test its ability to determine relative times of arrival (ToAs) or angles of arrival (AoAs) of such delayed RF signals.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include, at least, one or more sources of test signals (e.g., in the form of a vector signal generator, or "VSG") for providing the source signals to be transmitted to the DUT, and one or more receivers (e.g., in the form of a vector signal analyzer, or "VSA") for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path 20a, typically in the form of co-axial RF cable 20c and RF signal connectors 20tc, 20dc. As noted above, the tester typically includes a signal source 14g (e.g., a VSG) and a signal analyzer 14a (e.g., a VSA). The tester 12 and DUT 16 may also include preloaded information regarding predetermined test sequences, typically embodied in firmware 14f within the tester 12 and firmware 18f within the DUT 16. The testing details within this firmware 14f, 18f about the predetermined test flows typically require some form of explicit synchronization between the tester 12 and DUT 16, typically via the data packet signals 21t, 21d. Alternatively, testing may be controlled by a controller 30 which may be integral to the tester 12 or external (e.g., a programmed personal computer) as depicted here. The controller 30 may communicate with the DUT 16 via one or more signal paths (e.g., Ethernet cabling, etc.) 31d to convey commands and data. If external to the tester 12, the controller 30 may further communicate with the tester 12 via one or more additional signal paths (e.g., Ethernet cabling, etc.) 31t to convey additional commands and data.

Referring to FIG. 2, an alternative testing environment 10b uses a wireless signal path 20b via which the test data packet signals 21t and DUT data packet signals 21d may be communicated via respective antenna systems 20ta, 20da of the tester 12 and DUT 16.

Ordinarily when testing a wireless device (e.g., wireless fidelity (WiFi), Bluetooth, Zigbee, Z-Wave or similar device) with a tester, once communications between tester and DUT have been established, the tester and DUT will execute a test flow during which the tester or controller controls the behavior of the DUT (e.g., by executing control commands via driver software associated with the DUT). Commands may include instructing the DUT to receive test packets from the tester, or to transmit packets to the tester. The characteristics of the packets may also be controlled, such as power level, frequency, data rate, modulation, etc.

Currently, more wireless devices are including location-awareness capabilities for determining their physical location. An internal wireless positioning system uses localization information available from various internal sensors as well as measuring certain characteristics of signals received from external sources. For example, a relative location of a device may be estimated by measuring incoming signal parameters such as time-of-arrival (ToA) or angle-of-arrival (AoA) of the incoming signals. However, performing accurate and time-efficient testing of such capabilities has proven challenging in production testing environments. For example, the time delay resolution for AoA testing in mobile applications is usually in the range scale of sub-tens of picoseconds (psec), which is a difficult signal to generate. Also, one test technique involves over the air (OTA) testing. However, an OTA test requires large distances between the signal source and device under test (DUT) to ensure reception of a plane signal wave at the receiving antenna. Further, testing of different delays and incident angles requires changing such distance(s) and reorientation (e.g., rotation) of the DUT relative to the source. Both of these requirements are difficult to implement in a test environment. Accordingly, in view of increasing demand by users of such devices for accurate positioning data, a need exists for systems and methods to perform such testing.

SUMMARY

A system and method for providing variable time delays with high temporal granularity and consistent broadband delay performance for testing of time-of-arrival (ToA) or angle-of-arrival (AoA) performances of radio frequency (RF) signal transceivers. Multiple delays may be imparted to a common RF signal to provide multiple delayed RF signals corresponding to RF signals originating from a source location and received at various locations having respective position coordinates relative to respective orthogonal axes, plus another delayed RF signal corresponding to a RF signal originating from the source location and received at a location at an intersection of the orthogonal axes.

In accordance with an exemplary embodiment, a system for testing a device under test (DUT) capable of determining relative times of arrival (ToAs) or angles of arrival (AoAs) of multiple radio frequency (RF) signals includes: a RF signal source to provide a common RF signal; a plurality of signal terminals; and delay circuitry, in electrical communication with the RF signal source and the plurality of signal terminals, responsive to one or more control signals by imparting a plurality of variable delays to the common RF signal to provide to each of the plurality of signal terminals a respective one of a plurality of delayed RF signals. The plurality of delayed RF signals includes: a first delayed RF signal corresponding to a first RF signal originating from a source location and received at a first location having one of a first plurality of position coordinates relative to a first one of a plurality of orthogonal axes; and a reference delayed RF signal corresponding to a fourth RF signal originating from the source location and received at a reference location at an intersection of the plurality of orthogonal axes, wherein, responsive to first and second ones of the plurality of variable delays, the first plurality of position coordinates includes first and second different ones of the first plurality of position coordinates.

In accordance with another exemplary embodiment, a method for testing a device under test (DUT) capable of determining relative times of arrival (ToAs) or angles of arrival (AoAs) of multiple radio frequency (RF) signals includes: generating a common RF signal; providing a plurality of signal terminals; and responding to one or more control signals by imparting a plurality of variable delays to the common RF signal to convey to each of the plurality of signal terminals a respective one of a plurality of delayed RF signals. The plurality of delayed RF signals includes: a first delayed RF signal corresponding to a first RF signal originating from a source location and received at a first location having one of a first plurality of position coordinates relative to a first one of a plurality of orthogonal axes; and a reference delayed RF signal corresponding to a reference RF signal originating from the source location and received at a reference location at an intersection of the plurality of orthogonal axes, wherein, responsive to first and second ones of the plurality of variable delays, the first plurality of position coordinates includes first and second different ones of the first plurality of position coordinates.

DETAILED DESCRIPTION

Figure 1:
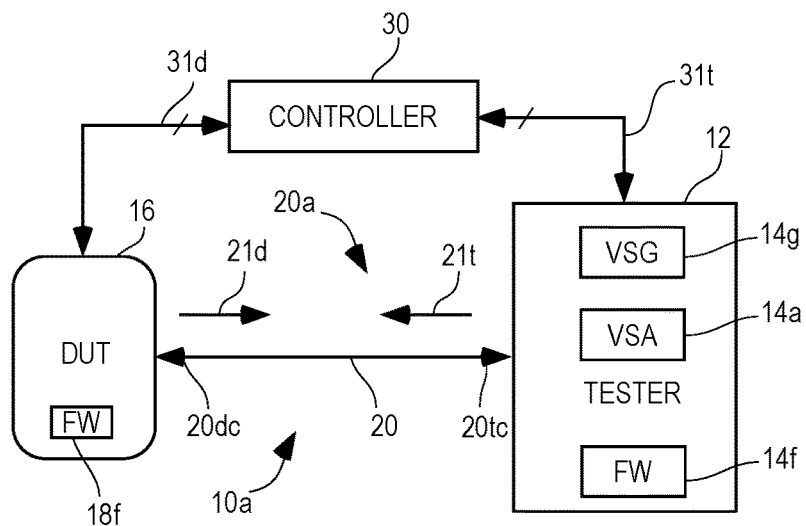
FIG. 1 depicts a typical testing environment for a radio frequency (RF) data packet signal transceiver device under test (DUT) in a conductive, or wired, environment.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("WiFi"), 3GPP LTE, Bluetooth, Zigbee, Z-Wave, etc. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and one or more transmitters. Thus, the tests are intended to confirm whether the receivers and transmitters both conform. Tests of the receiver(s) of the DUT (RX tests) typically involve a test system (tester) sending test packets to the receiver(s) and some way of determining how the DUT receiver(s) respond to those test packets. Tests of the transmitter(s) of the DUT (TX tests) are performed by having them send packets to the test system, which may then evaluate various physical characteristics of the signals from the DUT.

Testing of wireless devices, such as WiFi, Bluetooth, Zigbee and Z-Wave devices, has progressed from frequent two-way messaging between a tester and DUT to infrequent messaging between which major portions of test flows are executed within and coordinated between tester and DUT using non-link test solutions where only the unique device identifier and portions of the PHY are active. However, results of such tests would typically have been conveyed from DUT to tester via communications ports and pathways as the upper level of the protocol stack is not active, thereby preventing data from being easily conveyed in the transmitted packets. Therefore, where the only connection between a DUT and tester is either conducted or radiated signal paths and the data exchanged is via data packets, it may be difficult, if possible at all, for a DUT to convey test results to a tester using non-link test methods. As discussed in more detail below, in accordance with exemplary embodiments of the presently claimed invention, testing of a RF data packet transceiver can be performed, at least in part, by testing at lower layers of the network data packet signal communications protocol.

As discussed in more detail below, a programmable delay design is proposed, which, together with calibration, can achieve precise control of relative signal arrival times at the receiving antenna ports of a DUT. Such a programmable delay design may be implemented with passive signal delay elements, such as printed transmission lines, which may offer advantages over other approaches such as reactive (e.g., inductance(s) plus capacitance(s))  circuitry, coaxial cable or active signal delay line circuitry. Advantages include finer granularity (e.g., by varying the physical transmission line length), fast delay switching, broad bandwidth, high dynamic range (independent of signal levels), and operating environment stability. Together with calibration process the method can achieve highly repeatable and accurate time measurement capability for a positioning system.

Figure 2:
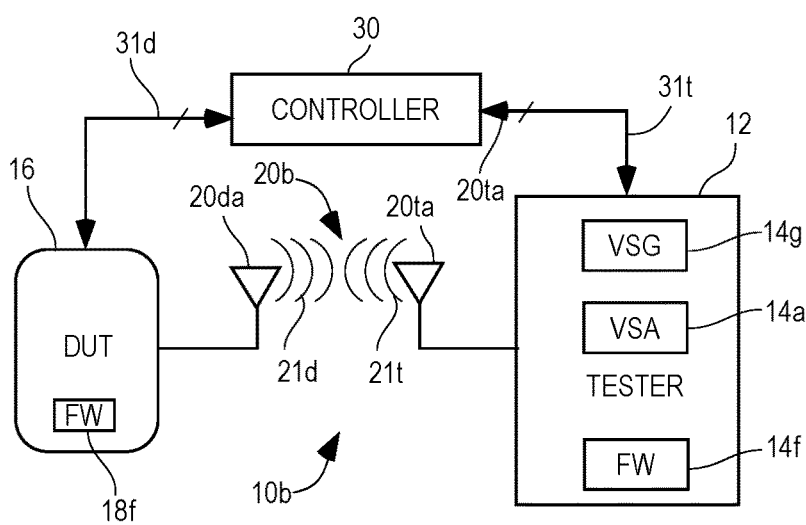
FIG. 2 depicts a typical testing environment for a RF data packet signal transceiver DUT in a radiative, or wireless, environment.
Figure 3:
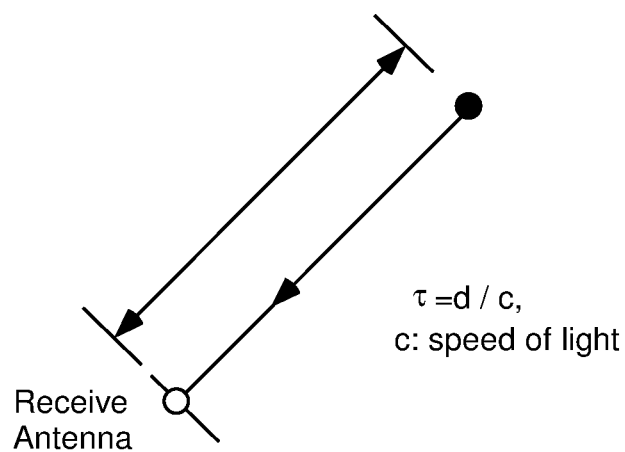
FIGS. 3 and 4 depict a two-dimensional (2D) signal receiving environment for determining time-of-arrival (ToA) and angle-of-arrival (AoA) of an incoming signal.
Figure 4:
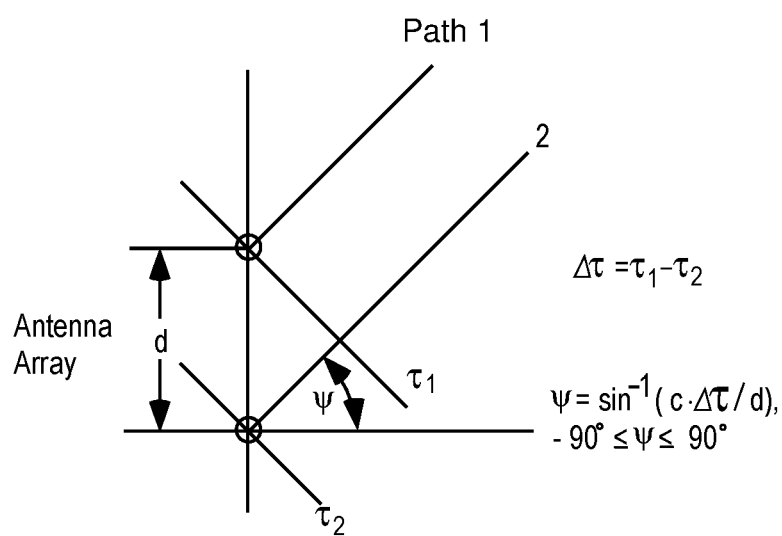

Referring to FIGS. 3 and 4, localization information in a wireless positioning system of a location-aware device can be estimated by measuring TOA (FIG. 1) and AOA (FIG. 2). These parameters are derived by measuring the difference in time $\Delta\tau$ of the received signals $\tau 1$, $\tau 2$ and translated into distance d and/or angle $\psi$ information in accordance with known principles.

Figure 5:
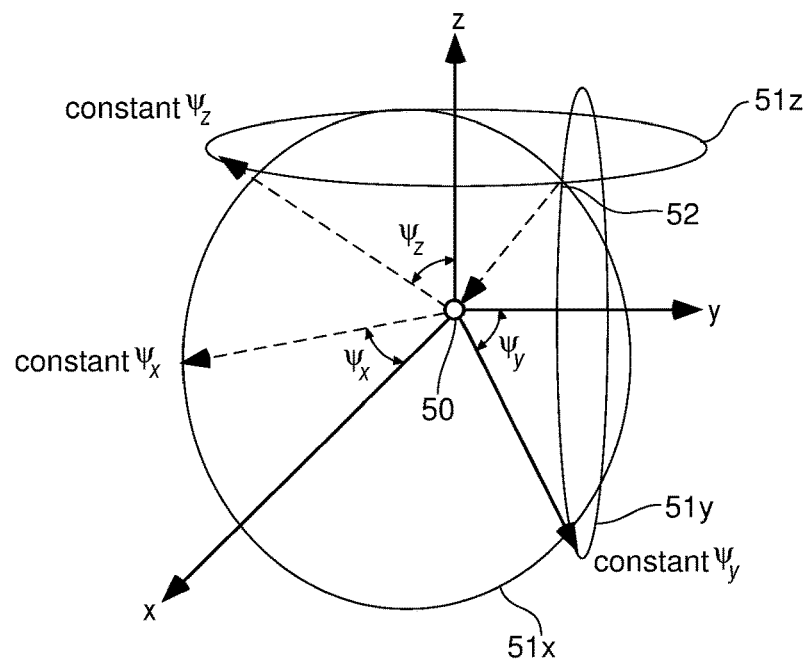
FIG. 5 depicts a three-dimensional (3D) signal receiving environment for determining angle-of-arrival (AoA) of an incoming signal.
Figure 6:
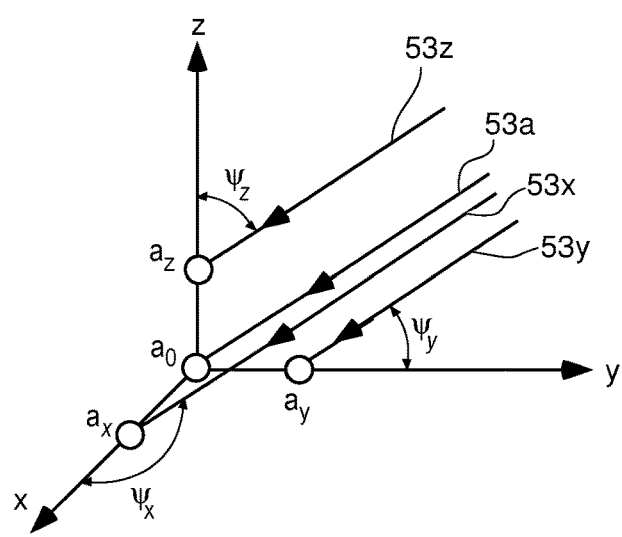
FIG. 6 depicts measured spatial relationships of multiple received test signals during testing in accordance with exemplary embodiments.

Referring to FIGS. 5 and 6, for purposes of 3D positioning, the AoA can be determined by measuring the incident angles $\psi x$, $\psi y$, $\psi z$ along their respective Cartesian axes X, Y, Z. With two elements per angle measurement required, four antenna ports a0, ax, ay, az are needed, and can be arranged as shown.

Referring to FIG. 5, the DUT 50, considered to be at the origin of the three orthogonal axes X, Y, Z, receives a signal from a point source 52 located in a direction $\Psi x$, $\Psi y$ and $\Psi z$ relative to the DUT 50. In other words, the location of the signal point source 52 is at the intercept of the three circles $51x$, $51y$, $51z$ along which their points have constant angles $\Psi x$, $\Psi y$, $\Psi z$ relative to the three axes X, Y, Z.

Referring to FIG. 6, four rays $53a$, $53x$, $53y$, $53z$ representing parts of a planar wave generated by the point source 52 arrive at the DUT antenna elements a0, ax, ay, az. It is assumed that the distance between the source 52 and the DUT 50 is very large (in terms of number of signal wavelengths), so delay variations due to axial offsets can be neglected. The three arrival angles can then be measured by antenna element pairs (a0, ax)=>$\Psi x$, (a0, ay)=>$\Psi y$, and (a0, az)=>$\Psi z$.

Figure 7:
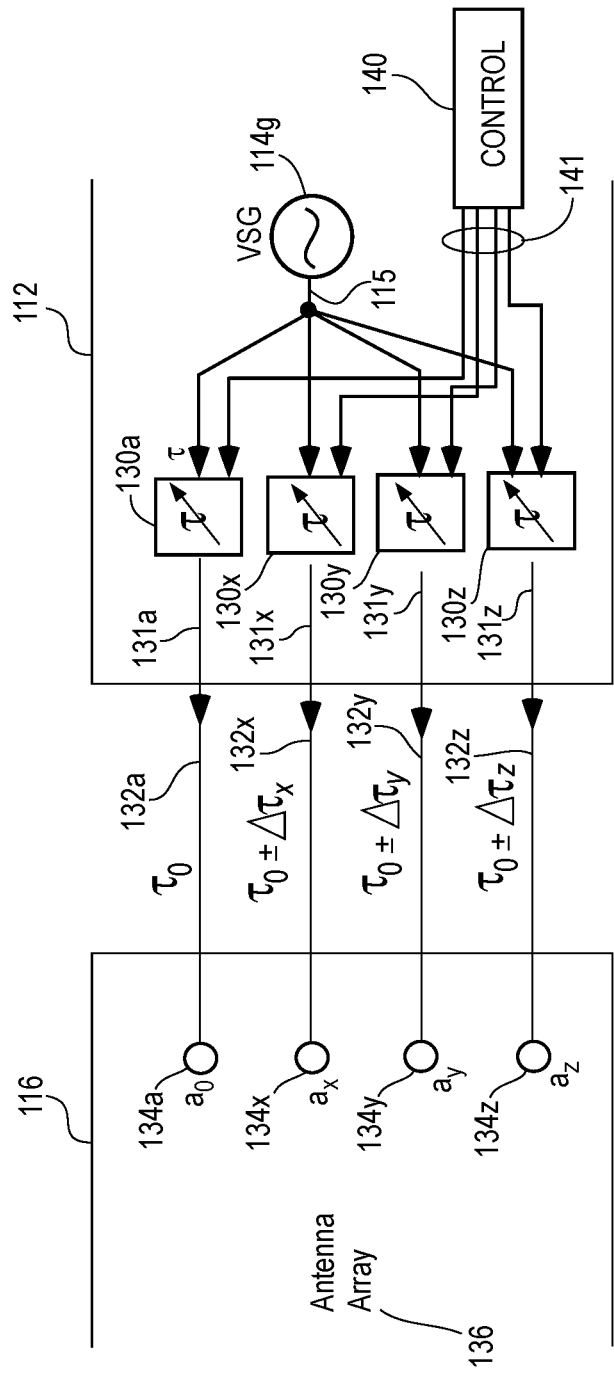
FIG. 7 depicts a system with multiple signal delay subsystems for producing the test signals of FIG. 5 in accordance with exemplary embodiments.

Referring to FIG. 7, the four signals needed for testing a location-aware device can be produced by providing a common RF signal 115 from a RF signal source 114g (e.g., a VSG within a tester 112) to each of four variable time delay circuits 130a, 130x, 130y, 130z (discussed in more detail below), each of which may be controlled (e.g., programmed) in accordance with one or more control signals 141 from a control source 140 (e.g., within or external to the tester 112). The resulting delayed signals 131a, 131x, 131y, 131z are conveyed, preferably via respective conductive signal paths 132a, 132x, 132y, 132z (e.g., RF cables), to terminals 134a, 134x, 134y, 134z of an antenna array 136 for the DUT 116. As discussed above (regarding FIGS. 5 and 6), the four signals thus provided have respective signal delays $\tau 0$, $\tau 0+\Delta\tau x$, $\tau 0+\Delta\tau y$, $\tau 0+\Delta\tau z$, where $\tau 0$ is a constant delay introduced by each of the delay circuits 130a, 130x, 130y, 130z, and each of the added delays $\Delta\tau x$, $\Delta\tau y$, $\Delta\tau z$ is a different delay introduced by a respective one of the delay circuits 130x, 130y, 130z for the directional component signals 131x, 131y, 131z.

Figure 8:
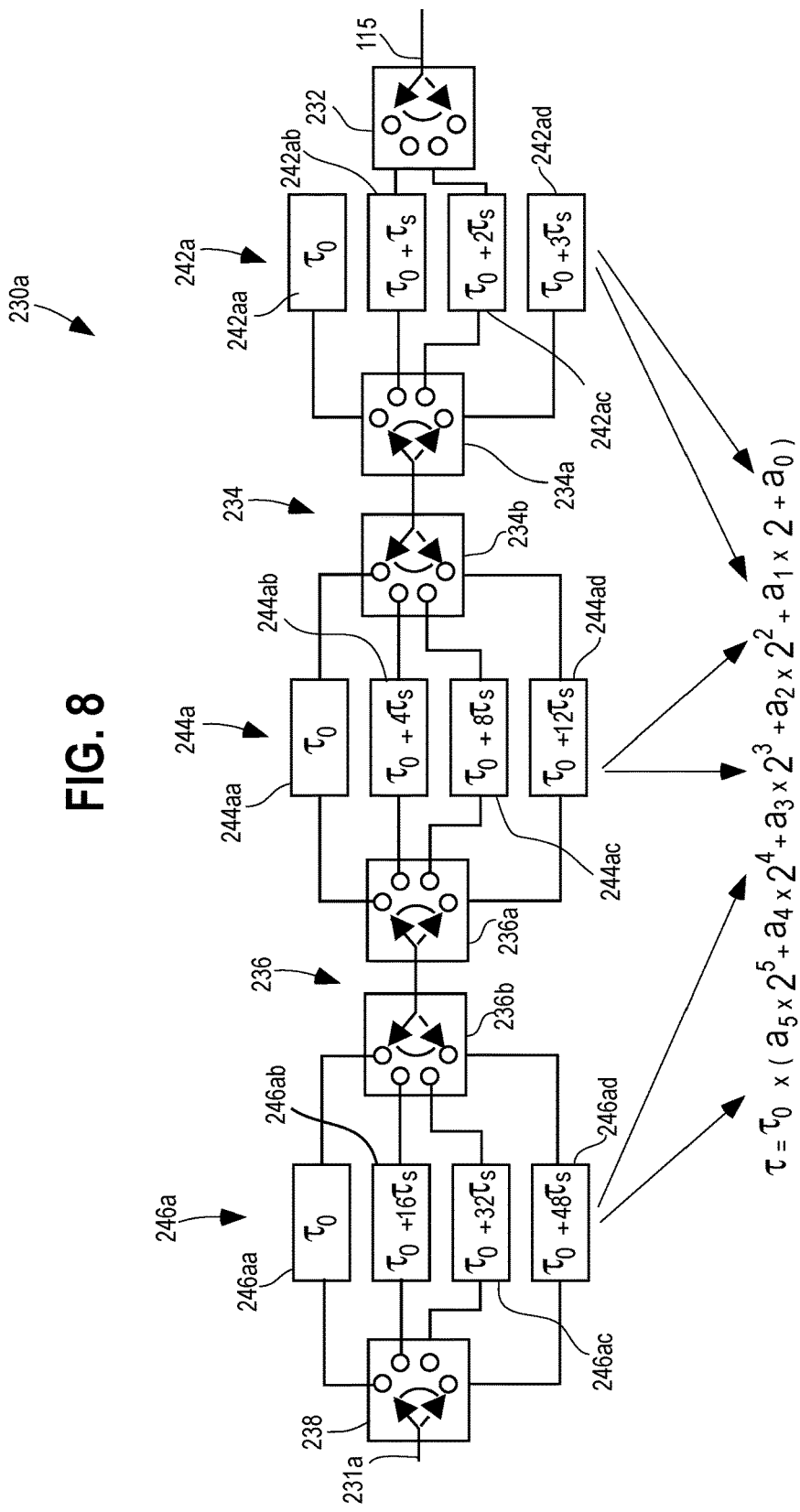
FIG. 8 depicts a circuit topology for the signal delay subsystems of FIG. 7 in accordance with exemplary embodiments.

Referring to FIG. 8, a system 230a with multiple signal delay subsystems in accordance with exemplary embodiments includes multiple stages 242a, 244a, 246a of controllable signal delays successively coupled via signal routing stages 232, 234, 236, 238. Examples of circuitry suitable for use as the signal routing stages 232, 234, 236, 238 include (without limitation) single-pole four-throw (SP4T) RF signal switches. The pole of the input stage 232 may receive the common RF signal 115 and the pole of the output stage 238 may provide the resultant delayed signal 231a. The intermediate stages 234, 236 may include SP4T RF signal switches 234a, 234b, 236a, 236b interconnected via their respective poles.

The signal delay stage 242a has substages available signal delays of $\tau 0$, $\tau 0+\tau S$, $\tau 0+2\tau S$, $\tau 0+3\tau S$, where $\tau 0$ is the constant delay and $\tau S$ is the desired additional delay step, or duration. The downstream signal delay stages 244a, 246a have corresponding added signal delays that successively higher by a factor of four: $\tau 0+4\tau S$, $\tau 0+8\tau S$ and $\tau 0+12\tau S$, and $\tau 0+16\tau S$, $\tau 0+32\tau S$ and $\tau 0+48\tau S$.

Figure 9:
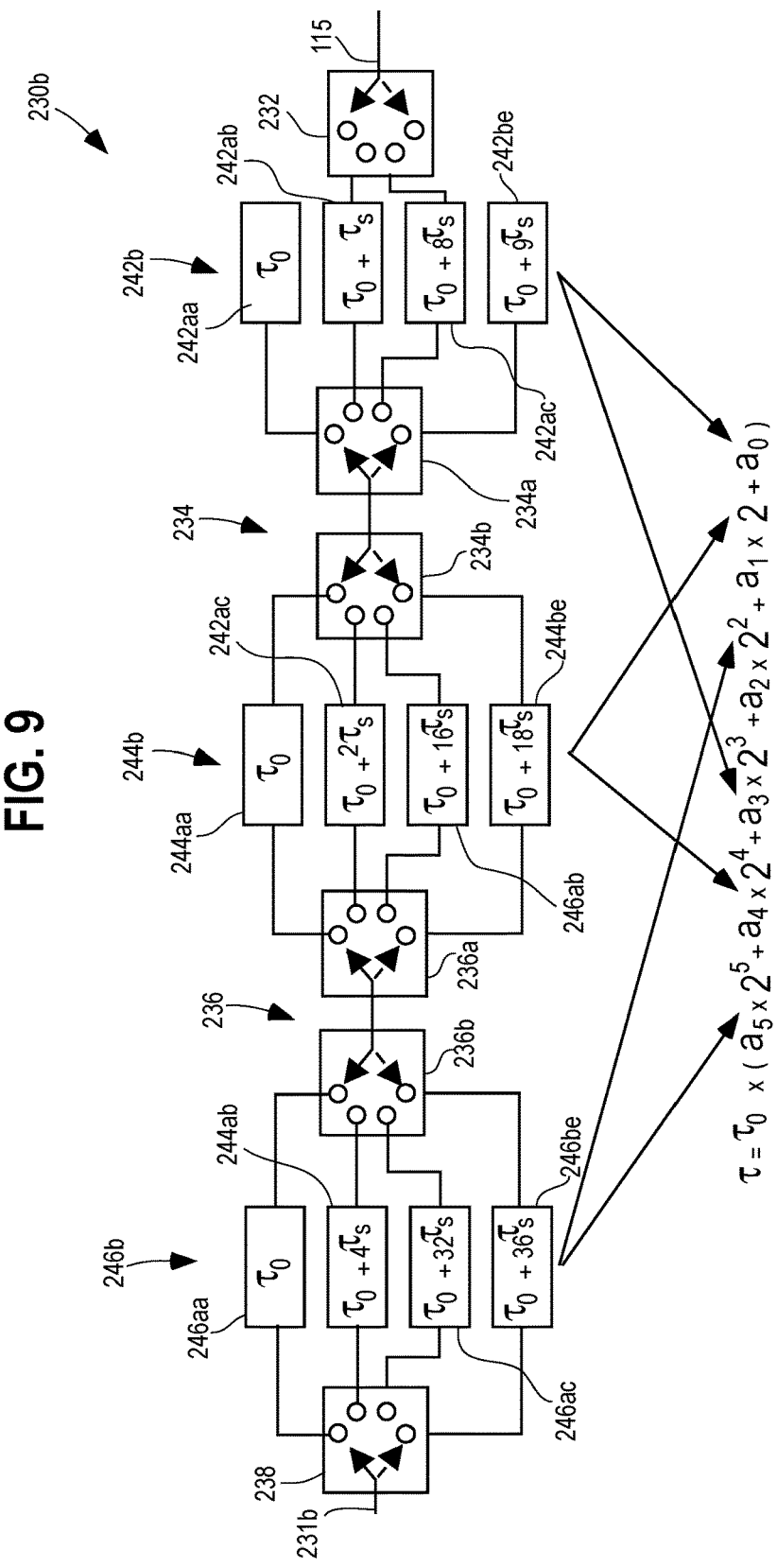
FIG. 9 depicts another circuit topology for the signal delay subsystems of FIG. 7 in accordance with exemplary embodiments.

Referring to FIG. 9, another system 230b with multiple signal delay subsystems in accordance with alternative exemplary embodiments similarly includes multiple stages 242b, 244b, 246b of controllable signal delays successively coupled via signal routing stages 232, 234, 236, 238. In this case, however, selected signal delay substages 242ac, 244ac, 246ab have been relocated from their previous delay stages 242a, 244a, 246a to other delay stages 244b, 242b, and different delay substages 242be ($\tau 0+9\tau S$), 244be ($\tau 0+18\tau S$), 246be ($\tau 0+36\tau S$) have been substituted. This advantageously produces signal delay stages 242b, 244b, 246b with respective combinations of higher and lower signal delays that, when implemented in passive signal elements such as microstrip, may be physically implemented in more consistently compact circuit designs.

In accordance with exemplary embodiments, a typical common delay step duration is may be 5 psec, though other durations may be used depending upon test conditions and performance requirements.

Based on the foregoing discussion, it can be readily appreciated that such delay circuitry topologies enable test systems capable of testing 3D AoA with high accuracy with multiple advantages, including: flat delay response over a broad frequency range; response delays independent of signal levels; an available range of adjustment of at least 300 psec (e.g., equivalent to 10 cm of RF signal propagation distance, which is the accuracy required by recent indoor positioning systems); a delay step size of 5 psec to ensure that angle measurement accuracy is limited only by the signal-to-noise ratio (SNR) of the received signal with virtually no contribution from the test system; precision time delay control enabled by programmable delay elements; testing 3D AoA under influences of multi-path and noise with high accuracy; programmable delay control of inputs to the receive antenna array for angle and distance tests; calibrated and retention of each delay combination to ensure that the time information can be derived precisely; fast delay switching intervals (e.g., within 20 microseconds) to ensure that switching time does not contribute significantly to overall ToA or AoA test time (which is typically in a range of several milliseconds); use of printed transmission line structures (e.g., microstrip) to enable fine time delay control with broadband performance, excellent repeatability and cost effectiveness. Fast switching among the available delay intervals may be of particular importance due to inaccuracies introduced by frequency drifting of the clock signal sources of the tester and DUT (which are usually independent, e.g., not frequency-locked). As the tester and DUT clock signal frequencies drift apart from one another, even only slightly, they may drift far enough to become significant as compared to the switching delay intervals, in which case delay measurements are compromised. Hence, the faster one can adjust the delays, fewer errors due to clock drift will be introduced. Also, as discussed above, cascaded, quad-switching structures may be used to achieve high delay resolution with minimum path loss, with broadband, wide dynamic range RF switches to maintain stability over frequency, temperature and RF signal power levels. Further, use of multiple signal paths enable control over lead-lag delay conditions to provide full acute angle measurement in AoA tests.

Various other modifications and alternatives in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing a device under test (DUT) capable of determining relative times of arrival (ToAs) or angles of arrival (AoAs) of multiple radio frequency (RF) signals, comprising:
    a RF signal source to provide a common RF signal;
    a plurality of signal terminals; and
    delay circuitry, in electrical communication with said RF signal source and said plurality of signal terminals, responsive to one or more control signals by imparting a plurality of variable delays comprising at least first and second ones of said plurality of variable delays to said common RF signal to provide to each of said plurality of signal terminals a respective one of a plurality of delayed RF signals including
        a first delayed RF signal of the plurality of delayed RF signals corresponding to a first RF signal originating from a source location and received at a first location having one of a first plurality of position coordinates relative to a first one of a plurality of orthogonal axes, and
        a reference delayed RF signal of the plurality of delayed RF signals corresponding to a reference RF signal originating from said source location and received at a reference location at an intersection of said plurality of orthogonal axes;
    wherein, responsive to the first and second ones of said plurality of variable delays, said first plurality of position coordinates includes first and second different ones of said first plurality of position coordinates corresponding to two of the plurality of the orthogonal axes.

2. The apparatus of claim 1, wherein:
    said plurality of delayed RF signals further includes a second delayed RF signal corresponding to a second RF signal originating from said source location and received at a second location having one of a second plurality of position coordinates relative to a second one of said plurality of orthogonal axes; and
    responsive to said first and second ones of said plurality of variable delays, said second plurality of position coordinates includes first and second different ones of said second plurality of position coordinates.

3. The apparatus of claim 2, wherein:
    said plurality of delayed RF signals further includes a third delayed RF signal corresponding to a third RF signal originating from said source location and received at a third location having one of a third plurality of position coordinates relative to a third one of said plurality of orthogonal axes; and
    responsive to said first and second ones of said plurality of variable delays, said third plurality of position coordinates includes first and second different ones of said third plurality of position coordinates.

4. The apparatus of claim 1, wherein said first plurality of position coordinates comprises a first plurality of distance coordinates away along said first one of said plurality of orthogonal axes.

5. The apparatus of claim 1, wherein said first plurality of position coordinates comprises a first plurality of acute AoAs relative to said first one of said plurality of orthogonal axes.

6. The apparatus of claim 1, wherein said first and reference delayed RF signals are delayed by first and reference time delays, respectively, relative to said common RF signal.

7. The apparatus of claim 1, wherein said first and reference delayed RF signals have first and reference signal phases, respectively, relative to said common RF signal.

8. The apparatus of claim 1, wherein said delay circuitry comprises a plurality of passive time delay circuit elements.

9. The apparatus of claim 1, wherein said delay circuitry comprises first and reference programmable delay circuits responsive to said one or more control signals by imparting first and reference delays to said common RF signal to provide said first and reference delayed RF signals, respectively.

10. The apparatus of claim 9, wherein each of said first and reference programmable delay circuits comprises:
    a first delay stage including a first plurality of passive time delay circuit elements and responsive to a first portion of said one or more control signals by delaying said common RF signal to provide an intermediate delayed signal corresponding to said common RF signal with one of a first plurality of added time delays; and a second delay stage in electrical communication with said first delay stage, including a second plurality of passive time delay circuit elements, and responsive to a second portion of said one or more control signals by delaying said intermediate delayed signal to provide a respective one of said first, second and reference delayed RF signals with one of a second plurality of added time delays.

11. The apparatus of claim 10, wherein:

said first plurality of added time delays comprises a first lower time delay, a first intermediate time delay and a first higher time delay;

said second plurality of added time delays comprises a second lower time delay, a second intermediate time delay and a second higher time delay;

said first and second intermediate time delays are longer than said first and second lower time delays, respectively, by a factor of two; and said first and second higher time delays are longer than said first and second lower time delays, respectively, by a factor of three.

12. The apparatus of claim 10, wherein:

said first plurality of added time delays comprises a first lower time delay, a first intermediate time delay and a first higher time delay;

said second plurality of added time delays comprises a second lower time delay, a second intermediate time delay and a second higher time delay;

said first and second intermediate time delays are longer than said first and second lower time delays, respectively, by a factor of eight; and said first and second higher time delays are longer than said first and second lower time delays, respectively, by a factor of nine.

13. A method for testing a device under test (DUT) capable of determining relative times of arrival (ToAs) or angles of arrival (AoAs) of multiple radio frequency (RF) signals, comprising:

generating a common RF signal;

providing a plurality of signal terminals; and responding to one or more control signals by imparting a plurality of variable delays comprising at least first and second ones of said plurality of variable delays to said common RF signal to convey to each of said plurality of signal terminals a respective one of a plurality of delayed RF signals including a first delayed RF signal of the plurality of delayed RF signals corresponding to a first RF signal originating from a source location and received at a first location having one of a first plurality of position coordinates relative to a first one of a plurality of orthogonal axes, and a reference delayed RF signal of the plurality of delayed RF signals corresponding to a reference RF signal originating from said source location and received at a reference location at an intersection of said plurality of orthogonal axes;

wherein, responsive to the first and second ones of said plurality of variable delays, said first plurality of position coordinates includes first and second different ones of said first plurality of position coordinates corresponding to two of the plurality of the orthogonal axes.

14. The method of claim 13, wherein:

said plurality of delayed RF signals further includes a second delayed RF signal corresponding to a second RF signal originating from said source location and received at a second location having one of a second plurality of position coordinates relative to a second one of said plurality of orthogonal axes; and responsive to said first and second ones of said plurality of variable delays, said second plurality of position coordinates includes first and second different ones of said second plurality of position coordinates.

15. The method of claim 13, wherein:

said plurality of delayed RF signals further includes a third delayed RF signal corresponding to a third RF signal originating from said source location and received at a third location having one of a third plurality of position coordinates relative to a third one of said plurality of orthogonal axes; and responsive to said first and second ones of said plurality of variable delays, said third plurality of position coordinates includes first and second different ones of said third plurality of position coordinates.

16. The method of claim 13, wherein said first plurality of position coordinates comprises a first plurality of distance coordinates away along said first one of said plurality of orthogonal axes.

17. The method of claim 13, wherein said first plurality of position coordinates comprises a first plurality of acute AoAs relative to said first one of said plurality of orthogonal axes.

18. The method of claim 13, wherein said first and reference delayed RF signals are delayed by first and reference time delays, respectively, relative to said common RF signal.

19. The method of claim 13, wherein said first and reference delayed RF signals have first and reference signal phases, respectively, relative to said common RF signal.

20. The method of claim 13, wherein said imparting a plurality of delays to said common RF signal to convey to each of said plurality of signal terminals a respective one of a plurality of delayed RF signals comprises conveying said common RF signal to each of said plurality of signal terminals via a respective one or more of a plurality of passive time delay circuit elements.

21. The method of claim 13, wherein said imparting a plurality of delays to said common RF signal to convey to each of said plurality of signal terminals a respective one of a plurality of delayed RF signals comprises responding to said one or more control signals by conveying said common RF signal to each of said plurality of signal terminals via a respective one or more programmable delay circuits.

22. The method of claim 21, wherein said conveying said common RF signal to each of said plurality of signal terminals via a respective one or more programmable delay circuits comprises:

responding to a first portion of said one or more control signals by delaying said common RF signal to provide an intermediate delayed signal corresponding to said common RF signal with one of a first plurality of added time delays; and responding to a second portion of said one or more control signals by delaying said intermediate delayed signal to provide a respective one of said first, second, third or fourth delayed RF signals with one of a second plurality of added time delays.

23. The apparatus of claim 22, wherein:
said first plurality of added time delays comprises a first lower time delay, a first intermediate time delay and a first higher time delay;
said second plurality of added time delays comprises a second lower time delay, a second intermediate time delay and a second higher time delay;
said first and second intermediate time delays are longer than said first and second lower time delays, respectively, by a factor of two; and
said first and second higher time delays are longer than said first and second lower time delays, respectively, by a factor of three.

24. The apparatus of claim 22, wherein:
said first plurality of added time delays comprises a first lower time delay, a first intermediate time delay and a first higher time delay;
said second plurality of added time delays comprises a second lower time delay, a second intermediate time delay and a second higher time delay;
said first and second intermediate time delays are longer than said first and second lower time delays, respectively, by a factor of eight; and
said first and second higher time delays are longer than said first and second lower time delays, respectively, by a factor of nine.

* * * * *